United States Patent [19]

Baron et al.

[11] Patent Number: 5,132,387

[45] Date of Patent: Jul. 21, 1992

[54] HINDERED AMINE LIGHT STABILIZER HYDRAZIDES FOR STABILIZING POLYURETHANE, POLYUREA AND POLYURETHANE-POLYUREA POLYMERS

[75] Inventors: Arthur L. Baron, Getzville; Terry N. Myers, Grand Island, both of N.Y.

[73] Assignee: Elf Atochem North America, Inc., Philadelphia, Pa.

[21] Appl. No.: 637,860

[22] Filed: Jan. 7, 1991

[51] Int. Cl.[5] .............................................. C08G 18/32
[52] U.S. Cl. ...................................... 528/49; 528/73; 521/166
[58] Field of Search ...................... 528/73, 49; 521/166

[56] References Cited

U.S. PATENT DOCUMENTS

| | | | |
|---|---|---|---|
| 4,145,512 | 3/1979 | Uhrhan et al. | 528/73 |
| 4,153,596 | 5/1979 | Oertel et al. | 528/73 |
| 4,178,279 | 12/1979 | Uhrhan et al. | 528/60 |
| 4,191,683 | 3/1980 | Brunetti et al. | 544/130 |
| 4,199,489 | 4/1980 | Short | 528/73 |
| 4,233,410 | 11/1980 | Rody et al. | 528/73 |
| 4,260,691 | 4/1981 | Rody et al. | 528/73 |
| 4,348,524 | 9/1982 | Karrer et al. | 546/187 |
| 4,692,486 | 9/1987 | Gugumus | 524/100 |
| 4,780,493 | 10/1988 | Cantatore et al. | 524/99 |
| 4,983,738 | 1/1991 | Kazmierczak et al. | 546/208 |
| 5,043,372 | 8/1991 | MacLeay | 524/103 |

FOREIGN PATENT DOCUMENTS 0219333  4/1987  European Pat. Off. .

OTHER PUBLICATIONS

*Kirk-Othmer Encyclopedia of Chemical Technology*, 3rd Ed., vol. 18, pp. 202-204, 1983.
*Kirk-Othmer Encyclopedia of Chemical Technology*, 3rd Ed., vol. 23, pp. 576-608, 1983.
"Advances in Light Stabilization of Polyurethanes", *Plastics Compounding*, May/Jun. 1987, pp. 13-14, 16, 18, 25-27, G. Capocci.

*Primary Examiner*—Maurice J. Welsh
*Assistant Examiner*—Rachel Johnson
*Attorney, Agent, or Firm*—Panitch Schwarze Jacobs & Nadel

[57] ABSTRACT

Stabilized polyurethanes, polyureas and polyurethane-polyurea polymers having hindered amine light stabilizers (HALS) bonded thereto by means of a hydrazide functionality attached to the HALS are provided. The synergistic effect of a second amide functional group in the HALS-hydrazide provides improved photostabilization efficiency as compared to HALS-hydrazides of the prior art.

6 Claims, No Drawings

HINDERED AMINE LIGHT STABILIZER HYDRAZIDES FOR STABILIZING POLYURETHANE, POLYUREA AND POLYURETHANE-POLYUREA POLYMERS

BACKGROUND OF THE INVENTION

1. Field of the Invention

This invention relates to stabilized polyurethane, polyurea and polyurethane-polyurea polymers. More particularly, the present invention relates to using hydrazide functionalized hindered amine light stabilizers (HALS) for stabilizing polyurethane, polyurea and polyurethane-polyurea polymers against the degradative effects of heat and/or light. The HALS of this invention have both an amide group and a hydrazide group for enhancing the photostabilization efficiency of the HALS. Furthermore, the hydrazide functionality is used to bond the HALS into the polyurethane, polyurea and polyurethane-polyurea polymer.

2. Description of the Prior Art

Polyurethanes, polyureas and polyurethane-polyurea polymers are extremely versatile and important classes of polymers, widely used in fabricating molded parts, foamed parts and fibers. When exposed to actinic radiation, polyurethane, polyurea and polyurethane-polyurea polymers degrade at varying rates depending on temperature, structure and light intensity.

Typically, stabilizers are added to polyurethane, polyurea and polyurethane-polyurea materials to preserve the useful lifetime of the materials. HALS have been shown to be effective light stabilizers for polyurethanes, polyureas and polyurethane-polyureas, particularly when used with other stabilizers, such as UV absorbers. See G. Capocci, "Advances in the Light Stabilization of Polyurethanes," *Plastics Compounding*, May/June 1987, pp. 13-14, 16, 18, 25-27.

Using hydrazide-substituted HALS for permanently stabilizing a polyurethane, a polyurea and a polyurethane-polyurea is generally known in the art. For example, U.S. Pat. No. 4,178,279 discloses a permanently stabilized polyurethane comprising HALS moieties chemically attached to the polyurethane molecule by a urethane linking group or a urea linking group. A process is disclosed for preparing the stabilized polyurethanes by incorporating the reactive HALS into the polymer formulation.

In its more preferred embodiments, U.S. Pat. No. 4,178,279 discloses using previously known HALS hydrazides having the general formula:

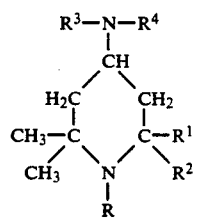

R, $R^1$ and $R^2$ are as defined in the patent and are not relevant for the purpose of the present invention. $R^4$ is hydrogen, —C(=O)—NH—NH$_2$ or, when $R^3$ is hydrogen, a straight chain or branched chain alkyl group of 1 to 20 carbons, a cycloalkyl group of 5 to 12 carbons, an aralkyl group of 7 to 12 carbons, an omega-cyanoalkyl group or a beta-alkoxy carbonylalkyl group. When $R^3$ is a straight chain or branched chain alkyl group of 1 to 20 carbons, a cycloalkyl group of 5 to 12 carbons, an aralkyl group of 7 to 12 carbons, an omega-cyanoalkyl group or an alkoxy carbonylalkyl group, $R^4$ is an omega-hydroxyalkyl group, an omega-N-alkylaminoalkyl group, an omega-hydroxyalkyl group or an omega-carboxylic acid hydrazidoalkyl group. In addition, when $R^3$ and $R^4$ do not contain an active hydrogen-containing group, for example, —NH$_2$ or —OH, R may also be an omega-aminoalkyl group, a beta-hydroxyalkyl group or a beta-carboxylic acid hydrazidoalkyl group.

U.S. Pat. No. 4,145,512 discloses permanently stabilized polyurethanes having polymer segments represented by the following formula:

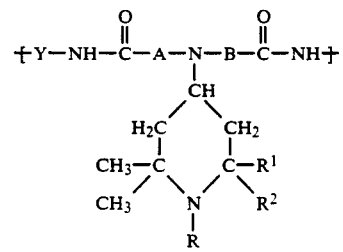

Y is derived from a diisocyanate or diisocyanate prepolymer and R is any one of several known HALS substituents. $R^1$ and $R^2$ are straight chain or branched chain alkyl groups or $R^1$ and $R^2$ are linked together to form a cycloalkyl ring. A is a direct bond, an omega-hydroxyalkyl group, an omega-aminoalkyl group, an omega-carboxylic acid hydrazido group, an omega-semicarbazido group or an omega-carbazic ester group. B is an omega-hydroxyalkyl group, an omega-aminoalkyl group, an omega-carboxylic acid hydrazido group or an omega-semicarbazido group. The presence of the above polymer segments in the polyurethane is selected to provide 0.05% to 5% by weight of HALS groups in the polyurethane.

Although not considered "prior art," copending U.S. Pat. application Ser. No. 310,408, filed Feb. 13, 1989, now U.S. Pat. No. 4,983,738, and abandoned parent U.S. Pat. application Ser. No. 84,602, filed Aug. 12, 1987, both assigned to the assignee of the present invention and application, disclose N-(2,2,6,6-tetraalkyl-4-piperidinyl)amic acid hydrazides having the general formula:

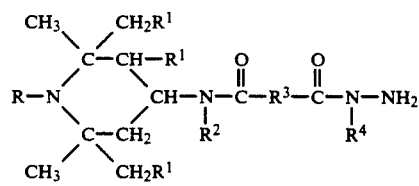

These amic acid hydrazides correspond to Formula III of the present invention, the hydrazide group providing a means of attaching the light stabilizer to isocyanate-containing polymers or monomers.

Although also not considered prior art, copending U.S. Pat. application Ser. No. 454,889, filed Dec. 22, 1989, now U.S. Pat. No. 5,043,372, assigned to the assignee of the present invention and application, discloses N,N'-hydrocarbylenebis-[N-(2,2,6,6-tetraalkyl-4-piperidinyl]amic acid hydrazides having the general formula:

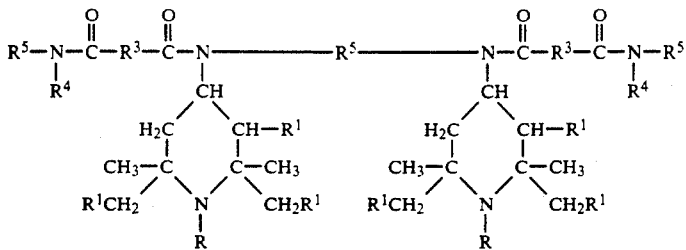

These amic acid hydrazides are efficient light stabilizers, the hydrazide groups providing means of attaching the light stabilizer to a suitable coreactive polymer.

The presence of a second amide group in the HALS-hydrazide moiety of the present invention is a major distinction from the prior art and advances the technology of stabilizing polyurethanes and polyureas and mixtures thereof with HALS. As indicated, this additional amide group enhances the photostabilizing effectiveness of the HALS stabilizer.

DEFINITIONS

As used herein, the term "acyl" refers to a radical generated from a carboxylic acid by the removal of the OH group to provide a free valence on the C(=O) group, for example, Q—COOH would become the Q—C(=O)— substituent referred to generally as a Q acyl group.

The polymers stabilized by the HALS hydrazides of the present invention are polymers comprising repeating urethane groups, referred to as a polyurethane, repeating urea groups, referred to as a polyurea, and both urethane and urea groups, referred to as a polyurethane-polyurea.

When any symbol appears more than once in a formula, its meaning in each instance is independent of one another.

SUMMARY OF THE INVENTION

One aspect of the present invention relates to a light stabilized polyurethane, polyurea or polyurethane-polyurea polymer comprising the polymer and a polymer bound additive attached to the polymer, the polymer bound additive having a Formula I or Formula II:

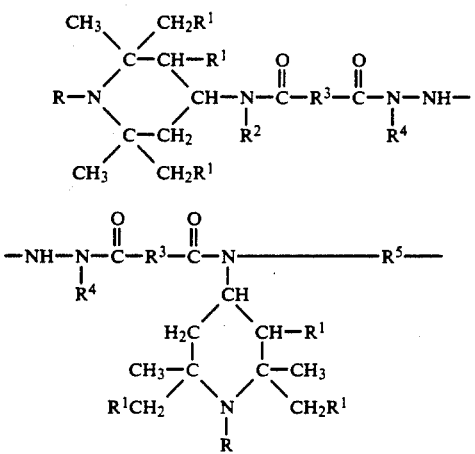

-continued

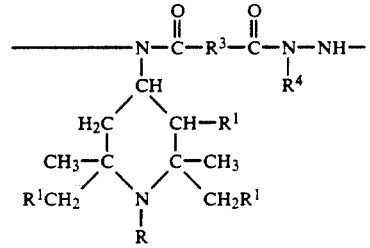

wherein

R is hydrogen, oxyl, hydroxy, substituted or unsubstituted aliphatic of 1–20 carbons, substituted or unsubstituted alicyclic of 5–12 carbons, substituted or unsubstituted araliphatic of 7–22 carbons, substituted or unsubstituted aliphatic acyl of 2–20 carbons, substituted or unsubstituted alicyclic acyl of 7–16 carbons, substituted or unsubstituted aromatic acyl of 7–11 carbons, substituted or unsubstituted araliphatic acyl of 7–22 carbons, $-(C(=O))_a-N(R^6)(R^7)$, $-(C(=O))_a-O-R^8$, $-(CH_2)_a-C(=O)-O-R^9$ or $-(CH_2-CH(R^{10})-O)_b-R^{11}$;

$R^1$ is hydrogen or aliphatic of 1–4 carbons;

$R^2$ is hydrogen, substituted or unsubstituted aliphatic of 1–20 carbons, a substituted or unsubstituted alicyclic group of 5–12 carbons which may contain an $-N(R^{12})-$ heteroatom as a group member, with the proviso that there are at least two carbon atoms between the $-N(R^{12})-$ heteroatom and the point of attachment of the alicyclic group, substituted or unsubstituted aryl of 6–14 carbons, substituted or unsubstituted araliphatic of 7–22 carbons or 2-cyanoethyl;

$R^3$ is a direct bond, a substituted or unsubstituted aliphatic diradical of 1–20 carbons, a substituted or unsubstituted aryl diradical of 6–12 carbons, a substituted or unsubstituted alicyclic diradical of 5–12 carbons or a substituted or unsubstituted araliphatic diradical of 7–22 carbons, where the diradical may contain $-O-$, $-S-$ or $-NH-$ heteroatoms, with the proviso that multiple heteroatoms must be separated from each other and the diradical ends by at least one carbon atom;

$R^2$ and $R^3$ may be linked together to form a 5-membered lactam ring;

$R^4$ is hydrogen, substituted or unsubstituted aliphatic of 1–20 carbons, substituted or unsubstituted araliphatic of 7–22 carbons or substituted or unsubstituted alicyclic of 5–12 carbons;

$R^5$ is a substituted or unsubstituted aliphatic diradical of 2–18 carbons, a substituted or unsubstituted alicyclic diradical of 5–18 carbons or a substituted or unsubstituted araliphatic diradical of 7–18 carbons, the aliphatic chains of which may contain $-O-$, $-S-$ or $-N(R^{12})-$ heteroatoms, with the proviso that multiple heteroatoms must be separated from each other and the diradical ends by at least two carbon atoms;

$R^6$ and $R^7$ are independently hydrogen, substituted or unsubstituted aliphatic of 1-20 carbons, substituted or unsubstituted aryl of 6-14 carbons, substituted or unsubstituted araliphatic of 7-22 carbons or a substituted or unsubstituted alicyclic group of 5-12 carbons which may contain an —N($R^{12}$)— heteroatom as a group member, with the proviso that there are at least two carbon atoms between the —N($R^{12}$)— heteroatom and the point of attachment of the alicyclic group;

$R^6$ and $R^7$ may be linked together by a direct bond or may be linked together through an —O— or —N($R^{12}$)— heteroatom to form a heterocyclic ring of 5-7 atoms, with the proviso that there are at least two carbon atoms between the —O— or —N($R^{12}$)— heteroatom and the nitrogen atom to which $R^6$ and $R^7$ are attached:

$R^8$ is substituted or unsubstituted aliphatic of 1-20 carbons, substituted or unsubstituted alicyclic of 5-12 carbons, substituted or unsubstituted aryl of 6-14 carbons or substituted or unsubstituted araliphatic of 7-22 carbons;

$R^9$, $R^{10}$ and $R^{11}$ are independently hydrogen, substituted or unsubstituted aliphatic of 1-20 carbons, substituted or unsubstituted alicyclic of 5-12 carbons, substituted or unsubstituted aryl of 6-14 carbons or substituted or unsubstituted araliphatic of 7-22 carbons;

$R^{12}$ is hydrogen, substituted or unsubstituted aliphatic of 1-20 carbons, substituted or unsubstituted alicyclic of 5-12 carbons, substituted or unsubstituted araliphatic of 7-22 carbons, substituted or unsubstituted aliphatic acyl of 2-20 carbons, substituted or unsubstituted alicyclic acyl of 7-16 carbons, substituted or unsubstituted aromatic acyl of 7-11 carbons, substituted or unsubstituted araliphatic acyl of 7-22 carbons, —(C(=O))$_a$—N($R^{13}$)($R^{14}$), —(C(=O))$_a$—O—$R^8$, —(CH$_2$)$_a$—C(=O)—O—$R^9$ or —(CH$_2$—CH($R^{10}$)—O)$_b$—$R^{11}$;

$R^{13}$ and $R^{14}$ are independently hydrogen, substituted or unsubstituted aliphatic of 1-20 carbons, substituted or unsubstituted aryl of 6-14 carbons, substituted or unsubstituted araliphatic of 7-22 carbons or a substituted or unsubstituted alicyclic group of 5-12 carbons which may contain an —NH— heteroatom as a group member, with the proviso that there are at least two carbon atoms between the —NH— heteroatom and the point of attachment of the alicyclic group;

$R^{13}$ and $R^{14}$ may be linked together by a direct bond or may be linked together through an —O— or —NH— heteroatom to form a heterocyclic ring of 5-7 atoms, with the proviso that there are at least two carbon atoms between the —O— or —NH— heteroatom and the nitrogen atom to which $R^{13}$ and $R^{14}$ are attached:

a is 1 or 2;

b is an integer from 2-50; and substituents for any of R, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ are one or more of chloro, bromo, alkyl of 1-8 carbons, alkoxy of 1-12 carbons, phenoxy, cyano, hydroxy, epoxy, carboxy, benzoyl, benzoyloxy, dialkylamino of 2-8 carbons, alkoxycarbonyl of 2-6 carbons, acyloxy of 1-4 carbons, acryloyl, acryloyloxy, methacryloyl, methacryloyloxy, hydroxymethyl, hydroxyethyl, alkylthio of 1-4 carbons or trialkoxysilyl of 3-12 carbons.

It may be desirable for a polymer to have combinations of polymer bound additives of Formulas I and II.

Another aspect of the present invention relates to a process for preparing a light stabilized polyurethane, polyurea or polyurethanepolyurea polymer comprising polymerizing a monomer blend having about 0.01% by weight to about 5% by weight, based upon the weight of the monomer, of a hindered amine light stabilizer having the following Formula III or Formula IV:

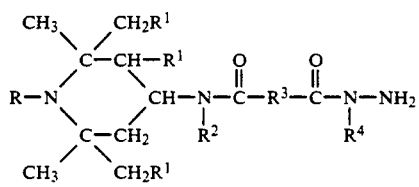

III

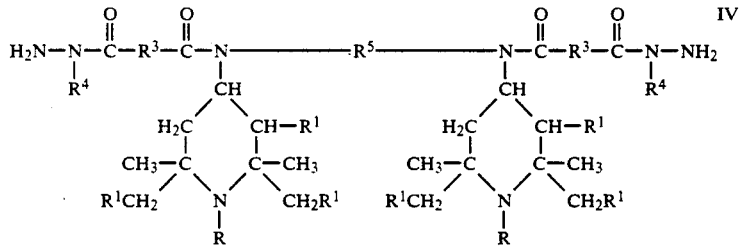

IV wherein $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$ and their substituents, as well as a and b, are all as defined above.

Preferably, R is hydrogen, substituted or unsubstituted aliphatic of 1-4 carbons, substituted or unsubstituted araliphatic of 7-10 carbons, substituted or unsubstituted aliphatic acyl of 2-6 carbons or substituted or unsubstituted benzoyl.

More preferably, R is hydrogen, methyl, acetyl or benzoyl.

Preferably, $R^1$ is hydrogen or methyl and is more preferably hydrogen.

Preferably, $R^2$ is hydrogen, alkyl of 1-4 carbons or 2,2,6,6-tetramethyl-4-piperidinyl and is more preferably hydrogen.

Preferably, $R^3$ is a direct bond, a substituted or unsubstituted alkylene diradical of 1-8 carbons or a substituted or unsubstituted o-, m- or p-phenylene diradical.

More preferably, $R^3$ is a direct bond or a substituted or unsubstituted alkylene diradical of 1-7 carbons.

Preferably, $R^4$ is hydrogen.

Preferably, $R^5$ is an alkylene diradical of 2 to 12 carbons, an alkylene diradical of 4 to 12 carbons which contains 1 to 2 —O or —NH— heteroatoms with the proviso that multiple heteroatoms must be separated from each other and the diradical ends by at least one carbon atom, a cycloalkylene diradical of 5 to 12 carbons, an arylene diradical of 6 to 12 carbons or an aralkylene diradical of 8 to 12 carbons.

More preferably, $R^5$ is an alkylene diradical of 2 to 6 carbons or an oxydialkylene diradical of 4 to 8 carbons.

Preferably, $R^6$, $R^7$, $R^{13}$ and $R^{14}$ are independently hydrogen, substituted or unsubstituted aliphatic of 1-8 carbons, substituted or unsubstituted phenyl or substituted or unsubstituted benzyl.

More preferably, $R^6$ and $R^{13}$ are independently hydrogen, methyl or ethyl and $R^7$ and $R^{14}$ are independently substituted or unsubstituted aliphatic of 1-8 carbons or substituted or unsubstituted phenyl.

Preferably, $R^8$ is substituted or unsubstituted aliphatic of 1-8 carbons, substituted or unsubstituted phenyl or substituted or unsubstituted benzyl.

Preferably, $R^9$, $R^{10}$ and $R^{11}$ are independently hydrogen, substituted or unsubstituted aliphatic of 1-8 carbons, substituted or unsubstituted phenyl or substituted or unsubstituted benzyl.

Preferably, $R^{12}$ is hydrogen, substituted or unsubstituted aliphatic of 1-4 carbons, substituted or unsubstituted araliphatic of 7-10 carbons, substituted or unsubstituted aliphatic acyl of 2-6 carbons or substituted or unsubstituted benzoyl.

More preferably, $R^{12}$ is hydrogen, methyl, acetyl or benzoyl.

DETAILED DESCRIPTION OF THE PREFERRED EMBODIMENTS

The novel stabilized polyurethane, polyurea and polyurethane-polyurea polymers of the present invention contain a hindered amine light stabilizing group comprising a hydrazide functionality and an amide functionality. The amide group and the hydrazide group enhance the photooxidative stabilizing properties of the hindered amine groups and impart thermooxidative stabilizing properties to the compounds.

Generic Group Examples:

As set forth in the above Summary of the Invention, the present invention is directed to a light stabilized polyurethane, polyurea or polyurethane-polyurea polymer comprising the polymer and a polymer bound additive attached to the polymer. The polymer bound additive has the following Formula I or Formula II:

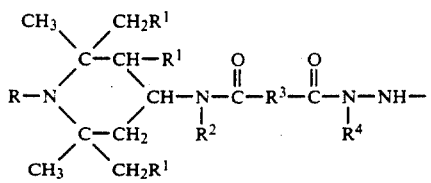

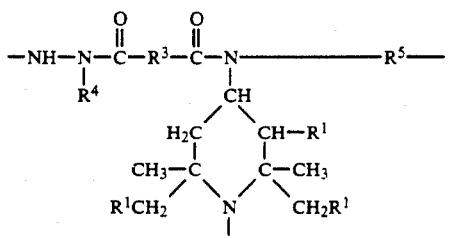

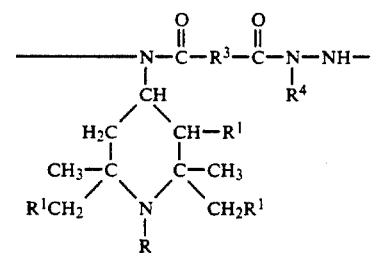

$R$, $R^1$, $R^2$, $R^3$, $R^4$ and $R^5$ are as defined above.

In addition, the present invention is directed to a process for preparing a light stabilized polyurethane, polyurea or polyurethane-polyurea polymer. The polymer is prepared by polymerizing a monomer blend having about 0.01% by weight to about 5% by weight, based upon the weight of the monomer, of a hindered amine light stabilizer having the following Formula III or Formula IV:

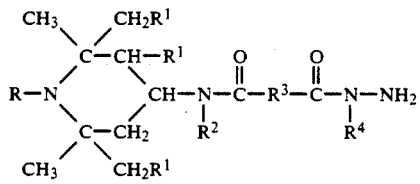

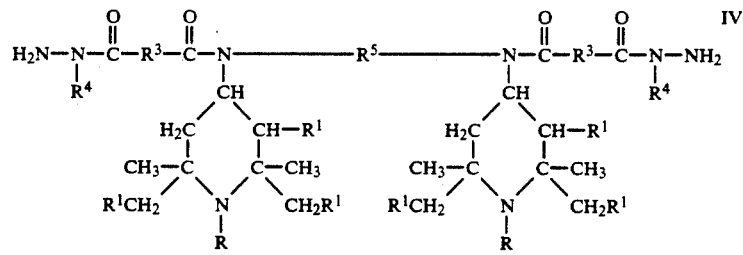

$R$, $R^1$, $R^2$, $R^3$, $R^4$ and $R^5$ are as previously defined. Specific, non-limiting examples of particular R groups are provided hereinafter.

As substituted or unsubstituted aliphatic of 1-20 carbons, R, $R^2$, $R^4$, $R^6$, $R^7$, $R^8$, $R^9$, $R^{10}$, $R^{11}$, $R^{12}$ and $R^{14}$ may be, for example, methyl, ethyl, n-propyl, isopropyl, sec-butyl, allyl, hexyl, heptyl, octyl, nonyl, decyl, propargyl, octadecyl, dodecyl, isododecyl, tetradecyl, 2-methallyl, 2-hexenyl, 10-undecenyl, 2-dodecenyl, n-butyl, 2-hydroxyethyl, 2-butenyl, 2-hydroxyhexadecyl, 2-hydroxypropyl, 2-hydroxydodecyl, 2-hydroxy-5-hexenyl, 2-hydroxyhexyl, 2-hydroxy-decyl, 2-hydroxyoctadecyl, 2-hydroxy-3-(methacryloyloxy)propyl, 2-hydroxy-3-(acryloyloxy)propyl, 2-hydroxy-3-phenoxypropyl, 2-hydroxy-3-(4-methoxyphenoxy)propyl, 2-hydroxy-3-(isopropoxy)propyl, 2-hydroxy-3-methoxypropyl, 2-hydroxy-3-(2-ethylhexyloxy)propyl, 2-hydroxy-3-(cyclohexyloxy)propyl, 2-hydroxy-3-(benzyloxy)propyl, 2-hydroxy-3-(benzoyloxy)propyl, 2-hydroxy-3-dodecyloxypropyl, 2-hydroxybutyl, 1-methyl-2-hydroxypropyl, cyanomethyl, 2,3-epoxypropyl or 2-(dimethylamino)ethyl.

As substituted or unsubstituted alicyclic of 5–12 carbons, R, $R^2$, $R^4$, $R^6$, $R^7$, $R^8$, $R^9$, $R^{10}$, $R^{11}$, $R^{12}$, $R^{13}$ and $R^{14}$ may be, for example, cyclohexyl, trimethylcyclohexyl, cyclooctyl, cyclododecyl, 4-t-butylcyclohexyl, 2-hydroxy-cyclododecyl, 3-cyclohexenyl, 2-hydroxycyclohexyl, 2-hydroxycyclopentyl, cyclododecyl, 4-octylcyclohexyl or 2-methyl-4-octylcyclohexyl.

As substituted or unsubstituted aryl of 6–14 carbons, $R^2$, $R^6$, $R^7$, $R^8$, $R^9$, $R^{11}$, $R^{13}$ and $R^{14}$, may be, for example, phenyl, tolyl, 4-chlorophenyl, isopropylphenyl, isopropenylphenyl, anisyl, 3,5-di(t-butyl)-4-hydroxyphenyl, 3,5-di(t-amyl)-4-hydroxyphenyl, 3-(t-butyl)-5-methyl-4-hydroxyphenyl, naphthyl, 3-methyl-5-t-butyl-4-hydroxyphenyl, 3,4,5-trimethoxyphenyl or 4-(dimethylamino)phenyl.

As substituted or unsubstituted araliphatic of 7–22 carbons, R, $R^2$, $R^4$, $R^6$, $R^7$, $R^8$, $R^9$, $R^{10}$, $R^{11}$, $R^{12}$, $R^{13}$ and $R^{14}$ may be, for example, benzyl, 3-methylbenzyl, 4-t-butylbenzyl, cinnamyl, 3,5-di-t-butyl-4-hydroxybenzyl, 2-hydroxy-2-phenylethyl, 2-phenylethyl, cumyl, trimethylbenzyl, 4-octyloxybenzyl, naphthylmethyl, (4-dodecylphenyl)methyl, 2-(3,5-di-t-butyl-4-hydroxyphenyl)ethyl, 2-(3,5-di-t-amyl-4-hydroxyphenyl)ethyl or 2-(3-t-butyl-5-methyl-4-hydroxyphenyl)ethyl.

As substituted or unsubstituted aliphatic acyl of 2–20 carbons, substituted or unsubstituted alicyclic acyl of 7–16 carbons, substituted or unsubstituted aromatic acyl of 7–11 carbons or substituted or unsubstituted araliphatic acyl of 7–22 carbons, R and $R^{12}$ may be, for example, formyl, acetyl, chloroacetyl, acryloyl, methacryloyl, propionyl, butyryl, 2-methylpropionyl, caproyl, capryloyl, lauroyl, crotonoyl, stearoyl, octadecanoyl, cyclohexylcarbonyl, 4-t-butylcyclohexylcarbonyl, 3-cyclohexenyl-1-carbonyl, cyclododecylcarbonyl, 4-octylcyclohexy-1-carbonyl, 2-ethoxy-2-oxoacetyl, 2-methoxy-2-oxoacetyl, 2-methyl-4-octylcyclohexylcarbonyl, benzoyl, toluoyl, 4-chlorobenzoyl, isopropylbenzoyl, anisoyl, hydroxybenzoyl, 3,5-di-t-butyl-4-hydroxybenzoyl, naphthoyl, 3-methyl-5-t-butyl-4-hydroxybenzoyl, 3,4,5-trimethoxybenzoyl, 4-dimethylaminobenzoyl, 3-(3,5-di-t-butyl-4-hydroxyphenyl)propionyl, cinnamoyl or dihydrocinnamoyl; R and $R^{12}$ are preferably alkanoyl of 2–5 carbons, cyclohexylcarbonyl, benzoyl or phenacyl.

As —(C(=O))$_a$—N($R^6$)($R^7$), R and $R^{12}$ may be, for example, N-methylcarbamoyl, N-butylcarbamoyl, N-octadecylcarbamoyl, N-dodecylcarbamoyl, N,N-dimethylcarbamoyl, N,N-diethylcarbamoyl, N-cyclohexylcarbamoyl, N,N-dihexylcarbamoyl, piperidin-1-ylcarbonyl, 2-(1-pyrrolidino)-2-oxoacetyl, piperazine-1-carbonyl, 4-methyl-piperazine-1-carbonyl, morpholin-1-carbonyl, 2-(dibutylamino)-2-oxoacetyl, 2-(phenylamino)-2-oxoacetyl, N-phenylcarbamoyl, N-benzylcarbamoyl, N-(4-butylphenyl)carbamoyl, N-(alphanaphthyl)carbamoyl, N-phenyl-N-hexylcarbamoyl, N-(trimethylphenyl)-N-amylcarbamoyl, N,N-diphenylcarbamoyl, N,N-di-(4-methylphenyl)carbamoyl or N-(4-benzylaminophenyl)-N-phenylcarbamoyl.

As —(C(=O))$_1$—O—$R^8$, R and $R^{12}$ may be, for example, methoxycarbonyl, 2-ethoxy-2-oxoacetyl, 2-methoxy-2-oxoacetyl, 2-cyclohexyloxy-2-oxoacetyl, 2-octadecyloxy-2-oxoacetyl, ethoxycarbonyl, phenoxycarbonyl, methallyloxycarbonyl, (2-methylphenoxy)carbonyl, allyloxycarbonyl, cyclopentoxycarbonyl, cyclohexoxycarbonyl, cyclododecyloxycarbonyl, (2-ethylhexyl)oxycarbonyl, ethoxycarbonyl, isopropoxycarbonyl or (4-octyloxyphenyl)carbonyl.

As —(CH$_2$)$_a$—C(=O)—O—$R^9$, R and $R^{12}$ may be, for example, methoxycarbonylmethyl, 2-(methoxycarbonyl)ethyl, butoxycarbonylmethyl, (benzyloxy)carbonylmethyl or 2-(benzyloxycarbonyl)ethyl.

As —(CH$_2$—CH($R^{10}$)—O)$_b$—$R^{11}$, R and $R^{12}$ may be, for example, nonylphenoxypoly(ethoxy)ethyl, butoxypoly(propoxy)ethyl, benzyloxypoly(ethoxy)ethyl, hydroxypoly(ethoxy)ethyl or 2-[hydroxypoly(propoxy)]-2-methylethyl.

As aliphatic of 1 to 4 carbons, $R^1$ may be, for example, methyl, ethyl, propyl, isopropyl, butyl, sec-butyl or t-butyl.

As a substituted or unsubstituted aliphatic diradical of 1–20 carbons, a substituted or unsubstituted aryl diradical of 6–12 carbons, a substituted or unsubstituted alicyclic diradical of 5–12 carbons or a substituted or unsubstituted araliphatic diradical of 7–22 carbons optionally containing —O—, —S— or —N($R^{12}$)— heteroatoms, $R^3$ may be, for example, 1,2-ethanediyl, methylene, 1,2-propenediyl, 1-phenyl-1,2-ethanediyl, 1,3-hexanediyl, 1,4-butanediyl, 1,2-cyclohexanediyl, 1,2-phenylene, 1,3-phenylene, 1,4-phenylene, 4-methyl-4-cyclohexene-1,2-diyl, 4-cyclohexene-1,2-diyl, 4-methylcyclohexane-1,2-diyl, propane-2,2-bis[4-cyclohexyl], 3-oxapentane-1,5-diyl, methylenebis[4-cyclohexyl], 1,2-phenylenebis(methyl), 1,3-phenylenebis(methyl), 1,4-phenylenebis(methyl), biphenyl-4,4'-diyl, biphenyl-3,3'-diyl, biphenyl-3,4'-diyl, methylenebis[phenylene], 1,2-propanediyl, 1,3-propanediyl, 1,4-butanediyl, 1,18-octadecanediyl, 2,2-dimethyl-1,3-propanediyl, 2-methylpentane-2,4-diyl, 1,10-decanediyl, 1,12-dodecanediyl, 3-oxapentane-1,5-diyl, 4-oxaheptane-1,7-diyl, 3,6-dioxaoctane-1,8-diyl, 4,9-dioxadodecane-1,12-diyl, 4-methyl-4-azaheptane-1,4-diyl, 3,6-diaza-3,6-dimethyl-1,8-octanediyl, 3-methyl-3-azapentane-1,5-diyl, 1,2-cyclohexanediyl or 1,4-cyclohexanediyl.

When alicyclic and optionally containing —N($R^{12}$)— as a group member, $R^2$, $R^6$ and $R^7$ may be, for example, 2,2,6,6-tetramethyl-4-piperidinyl, 2,6-diethyl-1,2,3,6-tetramethyl-4-piperidinyl, 1-acetyl-2,2,6,6-tetramethyl-4-piperidinyl or 1-(4-methylbenzoyl)-2,6-dimethyl-2,6-dipropyl-3-ethyl-4-piperidinyl.

When alicyclic and optionally containing —NH— as a group member, $R^{13}$ and $R^{14}$ may be, for example, 2,2,6,6-tetramethyl-4-piperidinyl, 2,6-diethyl-2,3,6-trimethyl-4-piperidinyl.

As a substituted or unsubstituted aliphatic diradical of 2–18 carbons, a substituted or unsubstituted alicyclic diradical of 5–18 carbons or a substituted or unsubstituted araliphatic diradical of 7–18 carbons, the aliphatic chains of which may optionally contain —O—, —S— or —N($R^{12}$)— heteroatoms, with the proviso that multiple heteroatoms must be separated from each other and the diradical ends by at least two carbon atoms, $R^5$ may be, for example, ethane-1,2-diyl, propane-1,3-diyl, propene-1,2-diyl, butane-1,4-diyl, pentane-1,5-diyl, hexane- 1,3-diyl, octadecane-1,18-diyl, 2,2-dimethylpropane-1,3-diyl, 2-azapropane-1,3-diyl, 2-methylpentane-1,5-diyl, decane-1,10-diyl, dodecane-1,12-diyl, 3-oxapentane-1,5-diyl, 4-oxaheptane-1,7-diyl, 3,6-dioxaoctane-1,8-diyl, 4,9-dioxadodecane-1,12-diyl, 4-methyl-4-azaheptane-1,7-diyl, 3,6-diaza-3,6-dimethyloctane-1,8-diyl, 3-methyl-3-azapentane-1,5-diyl, cyclohexane-1,2-diyl, hexane-1,6-diyl, octane-1,8-diyl, 3-hexene-1,6-diyl, 4-methylcyclohexane-1,2-diyl, 4-methyl-4-cyclohexene-1,2-diyl, methylenebis(4-cyclohexyl), 1,4-cyclohexanebis(methyl), 1,4-cyclohexanebis(2-ethyl), 1,2-ethylenebis(4-cyclohexyl), methylenebis(4-phenyl), 2,2-propanebis(4-phenyl), or 2,2-butanebis(4-phenyl).

PREPARATION OF COMPOUNDS OF THE PRESENT INVENTION

Methods for preparing polyurethanes, polyureas and polyurethane-polyurea polymers are well documented in the chemical literature. A polyurethane, a polyurea or a polyurethane-polyurea polymer may selectively be prepared, depending on the particular reagents used and the amounts of the particular reagents used to prepare the polymer. Procedures for preparing polyurethanes, polyureas and polyurethane-polyureas are generally well known in the art.

For example, polyurethanes may be prepared by reacting a bischloroformate with a diamine. Alternatively, polyurethanes may be prepared by reacting a diisocyanate with a diol, such as a macroglycol, a polyol, or a combination of a macroglycol and a short-chain glycol extender.

Polyureas, on the other hand, may be prepared by reacting a diisocyanate with a diamine which includes compounds containing multiple amino groups, for example, hydrazine, dihydrazides, and the like. Alternatively, a polyurea may be synthesized by reacting an isocyanate with water to form an unstable carbamic acid. The carbamic acid decomposes, evolving $CO_2$, forming an amino group which immediately reacts with excess isocyanate to form a urea linkage.

A polyurethane-polyurea polymer may be prepared, for example, by reacting a diisocyanate with both a diol and a diamine. As a result, both urethane linkages and urea linkages are formed in the resulting polymer. For convenience, the polyurethane-polyurea polymer may be prepared in a one-pot procedure, where the diisocyanate, diol and diamine are combined and reacted in a common reaction vessel.

The foregoing general methods for preparing a polyurethane, polyurea or polyurethane-polyurea polymer are generally well known to one of ordinary skill in the art, and additional synthetic procedures for preparing such polymers would be readily apparent to one of ordinary skill in the art.

If desired, the polymerization reactions may be conducted in the presence of desired reagents or additives, for example, chain breaking agents, including alcohols, amines, and hydrazine derivatives for terminating polymer chains, thereby providing molecular weight control of the product polymer; functional additives, including stabilizers for stabilizing the product polymer, such as hindered phenols, UV absorbers and fire retardants; and other additives and reagents, including divalent sulfur compounds, trivalent phosphorous compounds, metal chelates, catalysts, foaming agents, fillers, internal mold release agents, and isocyanate blocking agents. Specific examples of the foregoing additives and reagents are provided in the following list of illustrative compounds.

The prior art patents cited herein are descriptive of the known methods for preparing polyurethanes, polyurea, and polyurethane-polyurea polymers. The chapter on urethane polymers in the *Kirk-Othmer Encyclopedia of Chemical Technology*, 3rd Ed., Vol. 23, (1983) provides a broad review of the technology involved, including references. In addition, the processing of polyurethanes is discussed in *Kirk-Othmer Encyclopedia of Chemical Technology*, 3rd Ed., Vol. 18, pp. 202-204 (1983). These references are all incorporated herein by reference.

The N-(2,2,6,6-tetraalkyl-4-piperidinyl)amide hydrazide compounds, designated as Formula III, which are used to stabilize polyurethanes, polyureas, and polyurethane-polyurea polymers in accordance with the present invention may be prepared according to the methods described in U.S. Pat. application Ser. No. 84,602, filed Aug. 12, 1987, now abandoned and U.S. Pat. application Ser. No. 310,408, filed Feb. 13, 1989, allowed Jul. 19, 1990, Issue Fee paid Oct. 17, 1990, now U.S. Pat. No. 4,983,738, assigned to the assignee of the present invention. These references are incorporated herein by reference.

The N,N'-hydrocarbylenebis[N-(2,2,6,6-tetraalkyl-4-piperidinyl)amic acid hydrazides], designated as Formula VI, corresponding to Formula IV where $R^4$ is hydrogen, are prepared by the hydrazinolysis of the lower alkyl diesters of the corresponding N,N'-hydrocarbylenebis[N-(2,2,6,6-tetralkyl-4-piperidinyl)amic acids] (hereinafter "bis(half ester-half amides)")-(Formula V) with hydrazine or hydrazine hydrate.

The Formula V intermediate bis(half ester-half amides) are known and their method of preparation is described in U.S. Pat. No. 4,780,493, equivalent of U.K. Patent Application GB 2,174,093A, and U.S. Pat. No. 4,348,524, the disclosures of which are incorporated herein.

The unsubstituted hindered amine functions of the bis(half ester-half amides) (Formula V where R is H) can be derivatized by reacting the unsubstituted amine with alkyl halides, dimethyl sulfate, aliphatic, cycloaliphatic and aromatic acid chlorides, aliphatic, cycloaliphatic and aromatic chloroformates, dialkyl carbamoyl chlorides, aliphatic, cycloaliphatic and aromatic isocyanates, acrylonitrile, aliphatic epoxides, epichlorohydrins and alkylene oxides. These techniques are disclosed in U.S. Pat. Nos. 4,348,524 and 4,191,683 and European Patent Application Publication No. 219,333, published Apr. 22, 1987. Oxyl substituents can be introduced on the hindered nitrogen atoms by reacting the unsubstituted amine with peracids or hydrogen peroxide in the presence of tungsten catalysts (see U.S. Pat. No. 4,348,524). The oxyl radical may be converted to a hydroxyl radical in the presence of a hydrogen radical donor.

The general preparative method is illustrated by the following equation:

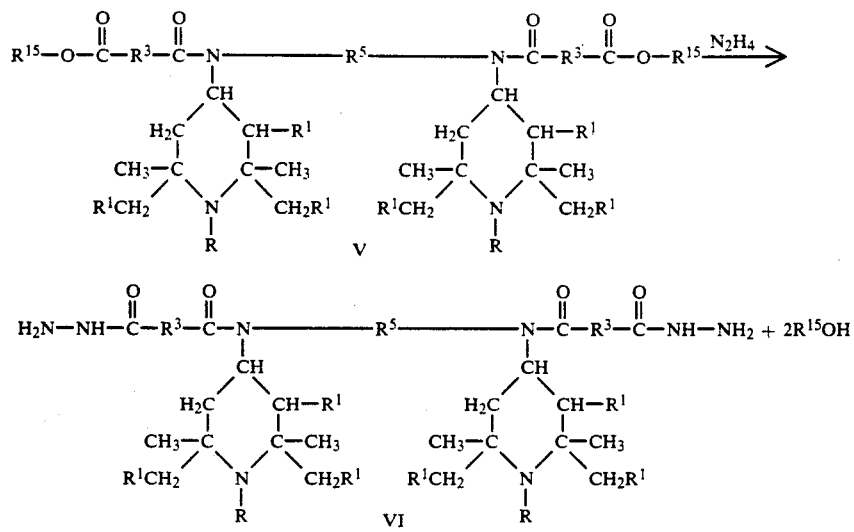

R, $R^1$, $R^3$ and $R^5$ are as broadly previously defined, $R^4$ is hydrogen and $R^{15}$ is lower alkyl of 1 to 4 carbons.

Preferably, the reaction is carried out with hydrazine or hydrazine hydrate in methanol or ethanol. The reaction generally proceeds at room temperature with the oxamate esters and generally requires heating or refluxing with the other amic acid esters.

Preparation of N,N'-Hydrocarbylenebis-[N-(2,2,6,6-tetraalkyl-4-piperidinyl)amic acid hydrazides] from Derivatives Thereof Substittued hydrazides of Formula IV may be prepared by hydrolyzing hydrazones of the following Formula VII:

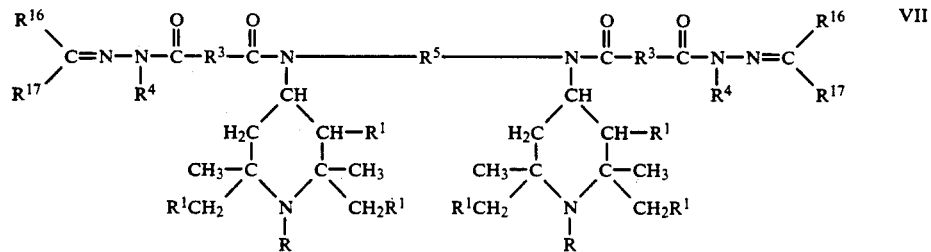

R, $R^1$, $R^2$, $R^3$, $R^4$ and $R^5$ are as broadly previously defined. The Formula VII hydrazones may be prepared by reacting ketone hydrazones or aldehyde hydrazones, designated each as Formula VIII, with the Formula V bis(half ester-half amides), as indicated by the following reaction equation:

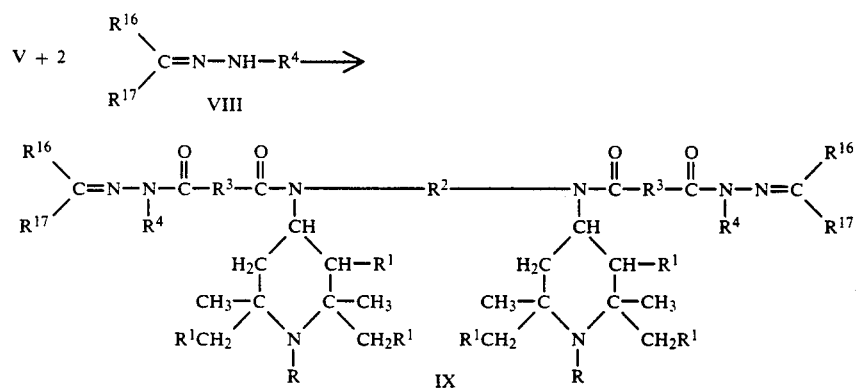

where
$R^4$ is as previously broadly defined; and
$R^{16}$ and $R^{17}$ are independently hydrogen, alkyl of 1 to 12 carbons, cycloalkyl of 5 to 12 carbons or substituted or unsubstituted aryl of 6 to 18 carbons, where the substituents are lower alkyl of 1 to 8 carbons, lower alkoxy of 1 to 8 carbons, hydroxy, bromine or chlorine; or $R^{16}$ and $R^{17}$ are linked together to form a substituted or unsubstituted alicyclic ring of 5 to 12 carbons, where the substituents are lower alkyl of 1 to 4 carbons; or $R^{16}$ and together form a substituted or unsubstituted piperidine ring of 5 to 15 carbons, where the substituents are lower alkyl of 1 to 4 carbons.

The reactions are carried out in dry, inert, polar solvents, such as methanol, ethanol, isopropanol or tetrahydrofuran (THF). Normally, the reactions are carried out at room temperature to 40° C. for the oxamic acid drivatives (i.e., the compound of Formula IX where $R^3$ is a direct bond). Additionally, the reactions require heating or refluxing to form the other amic acid derivatives.

Non-limiting examples of suitable Formula VIII hydrazones include acetone hydrazone, 2-butanone hydrazone, cyclohexanone hydrazone, acetophenone hydrazone, benzophenone hydrazone, acetone methylhydrazone, acetone ethylhydrazone, acetone isobutylhydrazone, 2-butanone cyclohexylhydrazone, cyclohexanone benzylhdyrazone, 2-pentanone cyclododecylhydrazone and 2-hexanone isopropylhydrazone.

The Formula VII hydrazones, where $R^4$ is alkyl of 1 to 8 carbons, aralkyl of 7 to 12 carbons or cycloalkyl of 5 to 12 carbons, may be hydrolyzed to afford the Formula IV substituted hydrazides. The method is illustrated by the following equation:

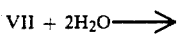

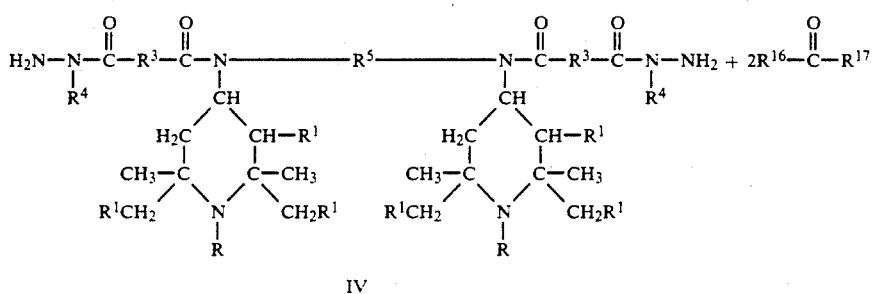

IV $R$, $R^1$, $R^2$, $R^3$, $R^4$, $R^5$, $R^{16}$ and $R^{17}$ are as broadly previously defined.

The hydrolysis reaction is carried out in water or aqueous alcohol. It can be catalyzed by a small amount of sulfuric acid or hydrochloric acid. However, if an acid catalyst is used, the reaction mixture should be neutralized before isolating the product. Preferably, the hydrolysis is carried out on the acetone derivative or the 2-butanone derivative (i.e., Formula IX where $R^{16}$ is methyl and $R^{17}$ is methyl or ethyl) wherein the aqueous reaction mixture is heated and the acetone or 2-butanone is distilled off as it forms.

List of Illustrative Preparative Compounds

The following lists of compounds are to provide specific, non-limiting examples of the various types of compounds which can be used to prepare the novel stabilized polyurethanes, polyureas and polyurethane-polyurea polymers, according to the present invention:

A. Polyols and polyamines, for example:
  (1) polyesters of adipic acid and diols of 2-12 carbon atoms
  (2) polyesters of caprolactone and diols of 2-12 carbon atoms
  (3) polyalkylene ether diols, for example, polytetramethylene ether diol, polytrimethylene ether diol, polypropylene glycol or polyethylene glycol
  (4) polyalkylene ether diols end-capped with an amine functionality, for example, poly(tetramethyleneoxide)-di-p-aminobenzoate
  (5) vinyl reinforced polyether polyols prepared, for example, by polymerizing styrene and/or acrylonitrile in the presence of a polyether
  (6) polyacetals
  (7) polycarbonates
  (8) polyesteramides
  (9) polybutadiene resins having primary hydroxy groups bound thereto B. Diisocyanates, for example:
  (1) diphenylmethane-4,4'-diisocyanate
  (2) toluene diisocyanate
  (3) m-xylylene diisocyanate
  (4) hexane-1,6-diisocyanate
  (5) dicyclohexylmethane-4,4'-diisocyanate
  (6) isophorone diisocyanate
  (7) p-phenylene diisocyanate
  (8) naphthalene-1,8-diisocyanate
  (9) 3,3'-dimethylbiphenyl-4,4'-diisocyanate
  (10) 2,2,4,4-tetramethylhexane-1,6-diisocyanate
  (11) 2,4,4-trimethylhexane-1,6-diisocyanate
  (12) cyclohexane-1,4-diisocyanate
  (13) 1,4-cyclohexylenebis(methylisocyanate)
  (14) 1,3-cyclohexylenebis(methylisocyanate)

C. Low molecular weight chain extenders, such as difunctional alcohols, trifunctional alcohols, amines and hydrazine derivatives or mixtures thereof, for example:
  (1) diols and glycols, for example, ethylene glycol, propylene glycol, neopentyl glycol, butanediol, xylylene glycols, m- and p-di(2-hydroxyethoxy)-benzene, diethylene glycol, 1,6-hexanediol, cyclohexanedimethanol, dipropylene glycol, tripropylene glycol or tri-, tetra-, penta- and hexaethylene glycols,
  (2) triols, for example, trimethylolpropane or p-di(2-hydroxyethoxy)benzene
  (3) amino alcohols, for example, ethanolamine, diethanolamine or triethanolamine
  (4) diamines, for example, diphenylmethane-4,4'-diamine, di(3-chlorophenyl)-methane-4,4'-diamine, ethylene diamine, propylene diamine, isophorone diamine, 1,3-diaminocyclohexane, 1,4-diaminocyclohexane, diaminoxylenes, diethyltoluenediamine or methylenebis(2-chloroaniline)
  (5) hydrazine derivatives, for example, hydrazine, carbodihydrazide, oxalyl dihydrazide, glutaric dihydrazide, pimelic dihydrazide, terephthalic dihydrazide, 2-aminopropionic hydrazide or semicarbazide D. Chain breaking agents, for example, alcohols, amines and hydrazine derivatives for terminating growing polymer chains, thereby providing molecular weight control and reduced tendency to premature gelling, for example:
  (1) secondary amines, for example, diethylamine, morpholine or dibutylamine
  (2) alcohols, for example, butanol, cyclohexanol or 2-ethylhexanol
  (3) hydrazine derivatives, for example, unsymmetrical dimethyl hydrazine E. Functional additives, for example:
  (1) hindered phenols, for example, butylated hydroxytoluene (BHT), 4,4'-thiobis(6-t-butyl-3-methylphenol), 2,2'-thiobis(6-t-butyl-4-methylphenol), alpha,alpha'-bis(2-hydroxy-3,5-dialkylphenyl)-diisopropylbenzenes, 2,2'-methylenebis(4-methyl-6-t-butylphenol), 2,2'-methylenebis(4-methyl-6-cyclohexylphenol), 1,1,3-tris(5-t-butyl-4-hydroxy-2-methylphenyl)butane, tetrakis(3,5-di-t-butyl-4-hydroxy-phenylpropionyloxymethyl)methane
  (2) divalent sulfur compounds, for example, dilaurylthiodipropionate
  (3) trivalent phosphorus compounds, for example, triphenylphosphite or tris(p-nonylphenyl)phosphite
  (4) UV absorbers, for example, derivatives of 2-(2-hydroxyphenyl)-2H-benzotriazole (e.g., 2-(2-hydroxy-5-methylphenyl)-2H- benzotriazole and 2-(3,5-di-t-butyl-2-hydroxyphenyl)-5-chloro-2H-benzotriazole), derivatives of 2-hydroxy-benzophenone (e.g., 2-hydroxy-4-octoxybenzophenone) and 2,4-di-t-butylphenyl 3,5-di-t-butyl-4-hydroxybenzoate or esters of 3-aryl-2-cyanoacrylic acid (e.g., ethyl 3,3-diphenyl-2-cyano-acrylate)
  (5) metal chelates, for example, 2,2'-thiobis(4-t-octylphenolate)-n-butylamine Ni(II)
  (6) surfactants, for example, polyoxyalkylene-polysiloxane copolymers
  (7) reactive and nonreactive fire retardants, for example, N,N-bis(2-hydroxyethyl)aminomethylphosphonate, esters of tetrabromophthalic acid or mineral fillers, such as alumina trihydrate
  (8) catalysts, for example, 1,4-diazabicyclo[2.2.2]octane, 1-azabicyclo[2.2.2]octane, 1,8-diazabicyclo[5.3.0]undec-7-ene, dibutyltin diacetate, dibutyltin dilaurate, triethylamine or carboxylic acid salts of cobalt, lead, zinc, manganese, calcium and zirconium
  (9) foaming agents, for example, carbon dioxide, trichlorofluoromethane, dichlorodifluoromethane or methylene chloride
  (10) fillers, for example, carbon black, silica or clay
  (11) internal mold release agents, for example, hydroxy- and carboxy-containing silicones
  (12) isocyanate blocking agents, for example, phenol, triazole, caprolactam or imidazoline derivatives, low molecular weight ketone oximes, low molecular weight oxamates or simple betaketoesters F. Hydrazine type chain extenders bearing hindered amine light stabilizer groups, such as those of Formula II ((1) through (5)) and those of Formula I ((6) through (8)):
  (1) N,N'-hexamethyenebis[N-(2,2,6,6-tetramethyl-4-piperidinyl)oxamic acid hydrazide]
  (2) N,N'-hexamethylenebis[N-(2,2,6,6-tetramethyl-4-piperidinyl)succinamic acid hydrazide]
  (3) N,N'-hexamethylenebis[N-(2,2,6,6-tetramethyl-4-piperidinyl)malonamic acid hydrazide]
  (4) N,N'-hexamethylenebis[N-(2,2,6,6-tetramethyl-4-piperidinyl)adipamic acid hydrazide]
  (5) N,N'-hexamethylenebis[N-(2,2,6,6-tetramethyl-4-piperidinyl)azelamic acid hydrazide]
  (6) N-[1-(2-hydroxyethyl)-2,2,6,6-tetramethyl-4-piperidinyl]-N'-aminooxamide
  (7) N-[1-(3-hydroxypropyl)-2,2,6,6- tetramethyl-4-piperidinyl]-N'-aminoglutaramide
  (8) N-[1-(2-hydroxy-4-oxa-6-ethyldecyl)-2,2,6,6-tetramethyl-4-piperidinyl]-N'-[(2-hydroxy-4-oxa-6-ethyldecyl)amino]oxamide G. Hydrazine type chain terminating agents bearing hindered amine light stabilizer groups of Formula I, for example:
  (1) N-(1,2,2,6,6-pentamethyl-4-piperidinyl)-N'-aminooxamide
  (2) N-(1-benzoyl-2,2,6,6-tetramethyl-4-piperidinyl)-N'-aminooxamide
  (3) N-(1-allyl-2,2,6,6-tetramethyl-4-piperidinyl)-N'-aminooxamide
  (4) N-(1-benzyl-2,2,6,6-tetramethyl-4-piperidinyl)-N'-aminooxamide
  (5) N-(1-ethoxycarbonyl-2,2,6,6-tetramethyl-4-piperidinyl)-N'-aminooxamide
  (6) N-(1-dodecyl-2,6-diethyl-2,3,6-trimethyl-4-piperidinyl)-N'-aminooxamide
  (7) N-(2,2,6,6-tetramethyl-4-piperidinyl)-N-butyl-N'-aminooxamide
  (8) N-(2,2,6,6-tetramethyl-4-piperidinyl)-N-phenyl-N'-aminosuccinamide
  (9) N-(2,2,6,6-tetramethyl-4-piperidinyl)-N-methyl-N'-methyl-N'-aminomalonamide
  (10) N-(2,2,6,6-tetramethyl-4-piperidinyl)-N'-aminoterephthalamide
  (11) N-(2,2,6,6-tetramethyl-4-piperidinyl)- N'-butyl-N'-aminosebacamide
  (12) N-(2,2,6,6-tetramethyl-4-piperidinyl)-N'-aminododecanamide
  (13) N-(2,2,6,6-tetramethyl-4-piperidinyl)-N'-aminosuberamide
  (14) N-(2,2,6,6-tetramethyl-4-piperidinyl)-N'-aminoglutaramide
  (15) N-(2,2,6,6-tetramethyl-4-piperidinyl)-N'-amino-2-methylsuccinamide
  (16) N-(2,2,6,6-tetramethyl-4-piperidinyl)-N'-amino-2,3-dimethylsuccinamide
  (17) N-(2,2,6,6-tetramethyl-4-piperidinyl)-N'-aminopimelamide
  (18) N-(2,2,6,6-tetramethyl-4-piperidinyl)-N'-aminoundecandiamide
  (19) N-(1-beta-hydroxyethyl-2,2,6,6-tetramethyl-4-piperidinyl)-N'-aminoadipamide
  (20) N-(1-beta-cyanoethyl-2,2,6,6-tetramethyl-4-piperidinyl)-N'-aminosuccinamide
  (21) N-(1-phenoxycarbonyl-2,2,6,6-tetramethyl-4-piperidinyl)-N'-aminooxamide
  (22) N-(2,6-diethyl-2,3,6-trimethyl-4-piperidinyl)-N'-aminooxamide
  (23) N,N-bis-(2,2,6,6-tetramethyl-4-piperidinyl)-N'-aminooxamide
  (24) N-(2,2,6,6-tetramethyl-4-piperidinyl)-N'-aminosuccinamide
  (25) N-(2,2,6,6-tetramethyl-4-piperidinyl)-N'-aminomalonamide
  (26) N-(2,2,6,6,-tetramethyl-4-piperidinyl)- N'-aminooxamide

(27) N-(2,2,6,6-tetramethyl-4-piperidinyl)-N'-aminoadipamide

(28) N-(2,2,6,6-tetramethyl-4-piperidinyl)-N'-aminoazelamide

(29) N-(1-acetyl-2,2,6,6-tetramethyl-4-piperidinyl)-N'-aminooxamide

(30) 4-hydrazinocarbonyl-1-(2,2,6,6-tetramethyl-4-piperidinyl)-2-pyrrolidone

Other reagents and additives to be used during the preparation of polyurethanes, polyureas and polyurethane-polyurea polymers, would be readily apparent to one of ordinary skill in the art.

Utility

The novel stabilizers of the present invention are very effective polymer bound stabilizers for stabilizing polyurethanes, polyureas and polyurethane-polyureas which are normally subject to thermal, oxidative or actinic light degradation. At times, it may be beneficial to add extraneous additives which will act as synergists with the hindered amine light stabilizing groups of the present invention. Examples of other additives that can be used in conjunction with the stabilizers of this invention include antioxidants, such as alkylated monophenols, alkylated hydroquinones, hydroxylated thiodiphenyl ethers, alkylidene-bisphenols, hindered phenolic benzyl compounds, acylaminophenols, esters of 3-(3,5-di-t-butyl-4-henyl)propionic acid, esters of 3-(5-t-butyl-4-hydroxy-3-methyl-phenyl)propionic acid, 3-(3,5-di-t-butyl-4-hydroxyphenyl)propionic acid amides; UV absorbers and light stabilizers, such as 2-(2'-hydroxyphenyl)-2H-benzotriazoles, 2-hydroxy-benzophenones, benzylidene malonate esters, esters of substituted or unsubstituted benzoic acids, diphenyl acrylates, nickel chelates, oxalic acid diamides, other hindered amine light stabilizers, other additives, such as metal deactivators, phosphites and phosphonites, peroxide decomposers, fillers and reinforcing agents, plasticizers, lubricants, corrosion and rust inhibitors, emulsifiers, mold release agents, carbon black, pigments, fluorescent brighteners, both organic and inorganic flame retardants and non-dripping agents, melt flow improvers and antistatic agents. Numerous examples of suitable additives of the above type are given in Canadian Patent 1,190,038.

The novel stabilizers of this invention can be blended with various polyurethanes, polyureas and mixtures thereof in high concentrations to form masterbatches or prepolymers which can then be blended with additional monomers either of the same or different type to form the final polyurethane, polyurea or polyurethanepolyurea composition.

The amount of stabilizer used to stabilize the polymeric composition will depend on the particular polymer system to be stabilized, the degree of stabilization desired and the presence of other stabilizers in the composition. Normally it is advisable to have about 0.01% to about 5% by weight of the 2,2,6,6-tetraalkylpiperidine moiety of the compositions of this invention present in the polymeric composition. An advantageous range is from about 0.05% to about 2% by weight of the 2,2,6,6-tetraalkylpiperidine portion of the molecule in the final composition. In most cases, about 0.1% to about 0.5% by weight is sufficient.

The polymer bound hindered amine light stabilizers are particularly useful in coatings formulations where the polymer has a large exposed surface area. Solvent based coatings (high solids or low solids) and powder coatings are advantageous use areas.

Reactive-injection molding (RIM) or liquid-injection molding (LIM) and its reinforced counterpart (RRIM) are important processes for preparing thermoset polyurethane, polyurea and polyurethane-polyurea elastomeric parts. Such parts are often exposed to the detrimental effects of light (as in automobile faces) and therefore require stabilization. The HALS compositions of the present invention provide a means to stabilize such parts and have the added advantage of being nonvolatile during the thermosetting step and nonextractable in end-use application.

Blends and alloys of polyurethane, polyurea and polyurethane-polyurea and other thermoplastic polymers may be prepared with the stabilized polymers of this invention. Such blends may be prepared by either dry-blending or co-extruding the stabilized polymer with acrylonitrile-styrene-butadiene terpolymer (ABS), poly(vinyl chloride) (PVC), polyacetal, styreneacrylonitrile (SAN) and cellulosic materials.

Polyurethane fibers may also be stabilized with the HALS-hydrazides of the present invention. Such fibers are often prepared by using hydrazine derivatives as chain extenders. Therefore, incorporating the HALS-hydrazides of the present invention into the polyurethane fibers is particularly appropriate.

The following examples are presented to provide a more detailed explanation of the present invention and are illustrations and not limitations of the invention.

EXAMPLE I

Preparation of N,N'-Hexamethylenebis[N-(2,2,6,6-tetramethyl-4-piperidinyl)oxamic acid hydrazide]

A) Preparation of Diethyl N,N'-hexamethylenebis[N-(2,2,6,6-tetramethyl-4-piperidinyl)oxamate]

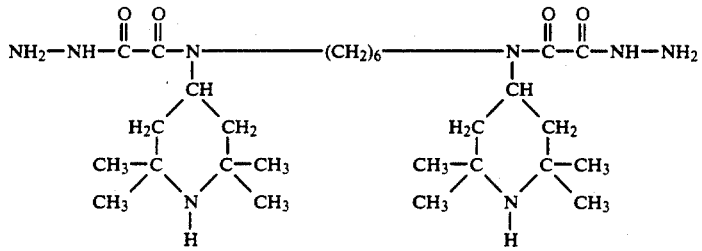

Into a 300 ml, 3-necked flask was introduced 1,6-hexamethylene triacetonediamine (19.7 g, 0.05 mole) and 200 ml of methylene chloride. The flask was equipped with a magnetic stirrer, a thermometer, a reflux condenser and a dropping funnel containing ethyl oxalyl chloride (14.0 g, 0.10 mole). The ethyl oxalyl chloride was added dropwise to the stirring diamine solution over 15 minutes while controlling the temperature between 20° C. and 30° C. with a cold water bath. After the addition was complete, the water bath was removed and the reaction was stirred for 3 hours at room temperature. The methylene chloride solution was added to a stirring solution of sodium carbonate (15 g) in 200 ml water. The mixture was stirred 5 minutes, transferred to a separatory funnel and the methylene chloride layer was separated. The methylene chloride layer was dried over anhydrous sodium sulfate, filtered and the methylene chloride was stripped off on a rotating evaporator under reduced pressure. The residue was a light brown viscous liquid weighing 32.9 g. The infrared spectrum of the product contained strong carbonyl bands at 1735 cm$^{-1}$ and 1650 cm$^{-1}$.

B) Preparation of N,N'-Hexamethylenebis[N-(2,2,6,6-tetramethyl-4-piperidinyl)oxamic acid hydrazide]

The residue from part A was dissolved in 100 ml of methanol and transferred to a 250 ml, 3-necked flask. The flask was equipped with a magnetic stirrer, a thermometer, a condenser and a dropping funnel containing 85% hydrazine hydrate (9.0 g, 0.15 mole). The hydrazine hydrate was added dropwise over about 5 minutes at 32° C. After the addition was complete, the reaction was stirred 1 hour and allowed to stand overnight. The next morning the reaction mixture was filtered to remove a small amount of insoluble material. The filtrate was then stripped of solvent. The sticky yellow residue was slurried in 150 ml of warm tetrahydrofuran (THF) until the residue turned into a fine white solid. The solid product was filtered off and air dried. The product weighed 31.7 g after drying and had a melting range of 185°–188° C. The infrared spectrum of the product had strong carbonyl bands at 1620 cm$^{-1}$ and 1670 cm$^{-1}$ and the ester band at 1735 cm$^{-1}$ in the oxamate had completely disappeared.

EXAMPLE II

Preparation of N,N'-Hexamethylenebis[N-(2,2,6,6-tetramethyl-4-piperidinyl)succinamic acid hydrazide]

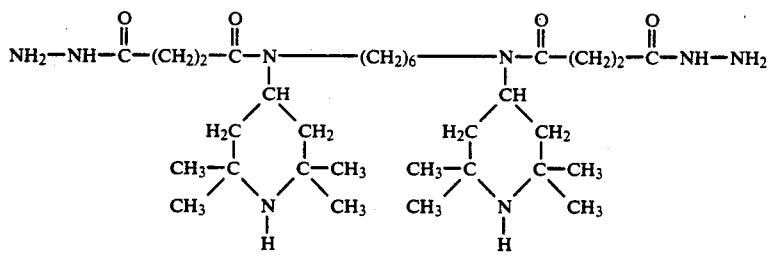

A) Diethyl N,N'-hexamethylenebis[N-(2,2,6,6-tetramethyl-4-piperidinyl)succinamate] was prepared according to the procedure of Example IA by adding ethyl succinyl chloride (16.5 g, 0.1 mole) to a solution of 1,6-hexamethylene triacetonediamine (19.7 g, 0.05 mole) in 200 ml of methylene chloride. After neutralizing and evaporating the solvent, a light tan solid was obtained weighing 30.9 g and melting at 110°–113° C. The infrared spectrum of the product contained strong carbonyl bands at 1730 cm$^{-1}$ and 1630 cm$^{-1}$.

B) N,N'-Hexamethylenebis[N-(2,2,6,6-tetramethyl-4-piperidinyl)succinamic hydrazide] was prepared by hydrazinolysis of 71.8 grams of a methanolic solution containing 21.4 g (0.033 mole) of the above succinamate with excess 85% hydrazine hydrate (12.9 g, 0.22 mole) according to the procedure of Example IB. The reaction was refluxed for three hours to complete the hydrazinolysis. Evaporation of the solvent afforded 27.8 g of a viscous yellow liquid which crystallized upon standing overnight (m.p. 81°–88° C.). The infrared spectrum (in CH$_2$Cl$_2$) had a strong, sharp carbonyl band at 1620 cm$^{-1}$ and a weaker carbonyl band at 1665 cm$^{-1}$ The ester band of the succinamate at 1730 cm$^{-1}$ had completely disappeared.

EXAMPLE III

Preparation of N,N'-Hexamethylenebis[N-(2,2,6,6-tetramethyl-4-piperidinyl)malonamic acid hydrazide]

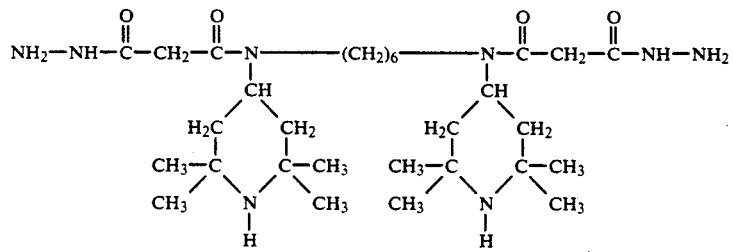

A) Diethyl N,N'-hexamethylenebis[N-(2,2,6,6-tetramethyl-4-piperidinyl)malonamate] was prepared according to the procedure of Example IA by adding ethyl malonyl chloride (15.06 g, 0.1 mole) to a solution of 1,6-hexamethylene triacetonediamine (19.7 g, 0.05 mole) in 200 ml of methylene chloride. After neutralizing and evaporating the solvent, a brown viscous liquid (28.5 g) was obtained. The infrared spectrum of the residue contained strong carbonyl bands at 1735 cm$^{-1}$ and 1640 cm$^{-1}$.

B) N,N'-Hexamethylenebis[N-(2,2,6,6-tetramethyl-4-piperidinyl)malonamic hydrazide] was prepared by hydrazinolysis of a solution of 28.5 g (0.05 mole) of the above malonamate in 75 ml of methanol with excess 54% hydrazine hydrate (11.85 g, 0.2 mole) according to the procedure of Example IB. After refluxing the methanolic reaction mixture for three hours, infrared spectroscopy indicated the ester group was completely converted to the hydrazide. The methanol was removed by evaporation and the product was dissolved in methylene chloride, washed with water, dried over anhydrous sodium sulfate and re-isolated by evaporating the methylene chloride. The product was a yellow viscous liquid and weighed 27.0 g. The infrared spectrum contained strong carbonyl bands at 1620 cm$^{-1}$ and 1670 cm$^{-1}$.

EXAMPLE IV

Preparation of
N,N'-Hexamethylenebis[N-(2,2,6,6-tetramethyl-4-piperidinyl)adipamic acid hydrazide]

EXAMPLE V

Preparation of
N,N'-Hexamethylenebis[N-(2,2,6,6-tetramethyl-4-piperidinyl)azelamic acid hydrazide]

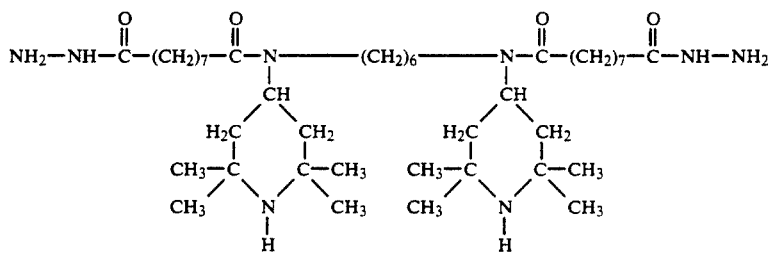

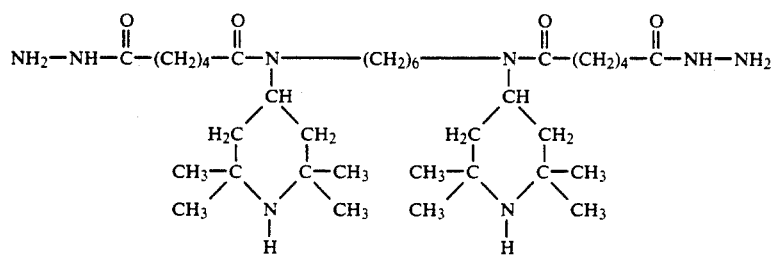

A) Diethyl N,N'-hexamethylenebis[N-(2,2,6,6-tetramethyl-4-piperidinyl)adipamate] was prepared according to the procedure of Example IA from monoethyl adipoyl chloride (9.2 g, 0.05 mole) and 1,6-hexamethylene triacetonediamine (9.9 g, 0.025 mole) in 125 ml of methylene chloride. After neutralizing and evaporating the solvent, a light brown viscous liquid (17.0 g) was obtained. The infrared spectrum of the residue contained strong carbonyl bands at 1735 cm$^{-1}$ and 1630 cm$^{-1}$.

B) N,N'-Hexamethylenebis[N-(2,2,6,6-tetramethyl-4-piperidinyl)adipamic acid hydrazide]was prepared by hydrazinolysis of a solution of 27.0 g (0.025 mole) of the above adipamate in 40 ml of methanol with excess 54% hydrazine hydrate (6.0 g, 0.1 mole) according to the procedure of Example IB. The methanolic solution was refluxed 5 hours to complete the hydrazinolysis. The reaction mixture was quenched and the product was isolated according to the procedure of Example IIIB. After evaporating the methylene chloride, the product obtained was a light brown viscous semisolid (17.05 g). The infrared spectrum of the product contained strong carbonyl bands at 1620 cm$^{-1}$ and 1660 cm$^{-1}$.

A) Diethyl N,N'-hexamethylenebis[N-(2,2,6,6-tetramethyl-4-piperidinyl)azelamate] was prepared according to the procedure of Example IA from monoethyl azelaoyl chloride (3.8 g, 0.017 mole) and 1,6-hexamethylene triacetonediamine (3.5 g, 0.009 mole) in 70 ml of methylene chloride. After neutralizing and evaporating the solvent, a light brown viscous liquid (6.45 g) was obtained. The infrared spectrum of the product contained strong carbonyl bands at 1735 cm$^{-1}$ and 1625 cm$^{-1}$.

B) N,N'-Hexamethylenebis[N-(2,2,6,6-tetramethyl-4-piperidinyl)azelamic acid hydrazide] was prepared by hydrazinolysis of a solution of 6.45 g (0.0085 mole) of the above azelamate in 40 ml of methanol with excess 54% hydrazine hydrate (3.35 g, 0.056 mole) according to the procedure of Example IIB. The methanolic solution was refluxed 5 hours to complete the hydrazinolysis. The reaction mixture was quenched and the product was isolated according to the procedure of Example IIIB. After evaporating the methylene chloride, the product weighed 6.6 g and was a yellow viscous liquid. The infrared spectrum of the product contained strong carbonyl bands at 1620 cm$^{-1}$ and 1660 cm$^{-1}$.

EXAMPLE VI

Preparation of the Di-[N,N'-hexamethylenebis[N-(2,2,6,6-tetramethyl-4-piperidinyl)oxamio acid hydrazone] of 2-Butanone

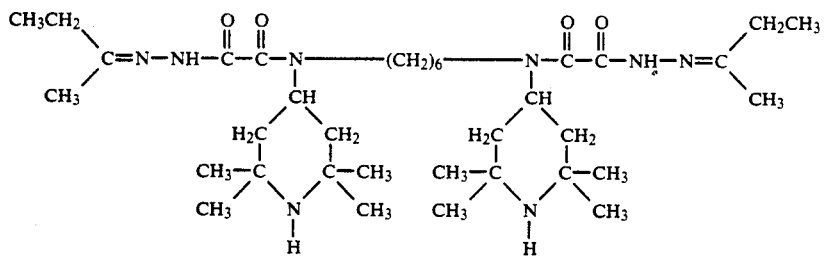

Into a 250 ml, 3-necked flask was introduced N,N'-hexamethylenebis[N-(2,2,6,6-tetramethyl-4-piperidinyl)oxamic acid hydrazide] (11.33 g, 0.02 mole), 2-butanone (3.6 g, 0.05 mole) and 125 ml of xylene. The flask was equipped with a magnetic stirrer, a thermometer and a reflux condenser. The flask was heated in an oil bath to reflux gently at about 126° C. for 1 hour. After refluxing 1 hour, a Dean Stark trap was added to the apparatus and the reaction mixture was azeotropically distilled until no additional water collected in the Dean Stark trap (2 hours). The reaction mixture was cooled to 90° C. and transferred to a 500 ml round bottomed flask. The xylene was stripped off on a rotating evaporator under reduced pressure with the aid of a heat gun. The residue was scraped out of the flask and pulverized with a mortar and pestle into a straw-colored powder. The product weighed 8.8 g and had a melting range of 96°-100° C. The infrared spectrum of the product in methylene chloride contained strong, sharp carbonyl bands at 1670 and 1640 cm$^{-1}$.

EXAMPLE VII

Preparation of the Di-[N,N'-hexamethylenebis[N-2,2,6,6-tetramethyl-4-piperidinyl)succinamic acid hyyrazone] of 2-Butanone

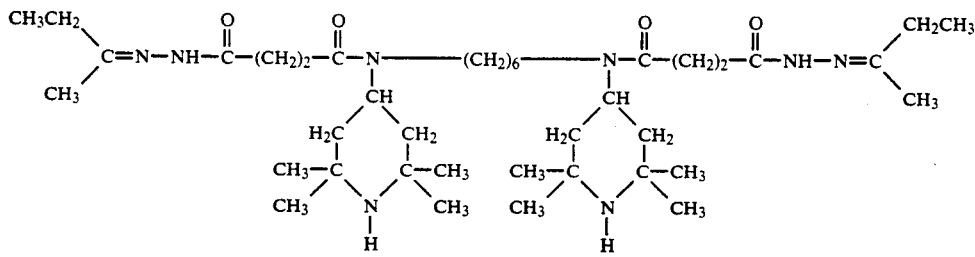

Di[N,N'-hexamethylenebis[N-(2,2,6,6-tetramethyl-4-piperidinyl)succinamic acid hydrazone] of 2-butanone was prepared by reacting N,N'-hexamethylenebis[N-(2,2,6,6-tetramethyl-4-piperidinyl)succinamic acid hydrazide] of Example II (12.45 g, 0.02 mole) with 2-butanone (3.6 g, 0.05 mole) according to the procedure of Example XV. The isolated product weighed 10.4 g and had a melting range of 50°-54° C. An infrared spectrum of the product in methylene chloride contained strong carbonyl bands at 1675 cm$^{-1}$ and 1630 cm$^{-1}$.

EXAMPLE VIII

Polyurethane Formulation

Into a dried flask were combined 28.0 g of Niax TM E-351 (ethylene oxide capped polyoxypropylene diol, a product of Union Carbide Corporation), 20.0 g Isonate TM 143L (80% 4,4'-diphenylmethane diisocyanate and 20% higher molecular weight polymers, a product of Upjohn Company) and 94 g dimethylformamide (DMF). The resulting mixture was heated to 100° C. with a preheated oil bath for 30 minutes. The mixture was then cooled to room temperature with an ice bath. The total weight of the prepolymer (mixture A) was 142 g.

Into a separate flask was combined 1,6-hexanediol (3.0 g), diethyltoluenediamine (3.0 g), butanol (0.4 g), HALS hydrazide (0.5 g) and DMF (76 g). The total weight of extenders, chain breakers and HALS hydrazide (mixture B) was 83 g.

One-half of each of mixtures A and B were combined and mixed for 30 seconds. The resulting mixture was subsequently poured into two 6"×6"×1/16" molds previously sprayed with silicon mold release agent. The molds were placed into a vented oven and heated to 55° C. for 30 minutes, followed by heating to 100° C. for 90 minutes, followed by heating to 115° C. for 30 minutes. The molds were removed and briefly cooled. The polyurethane films were removed while the molds were still warm. This procedure was repeated several times to prepare the films required to complete accelerated weather testing.

EXAMPLE IX

Accelerated Weathering of stabilized Films

The polyurethane films prepared in Example 1 were cut into 4½" tensile bars and placed in the QUV Accelerated Weather Tester (a product of the Q-Panel Company). The QUV contained UV-A (340) bulbs and was set for 4 hours condensation (dark) at 50° C. and 8 hours of light exposure at 60° C. Tensile bars were removed periodically and allowed to rest at room temperature for several days. The retained elongation (%) was measured using an instrumented Instron (model 4204) equipped with an extensometer. The crosshead speed was 0.5 inches/minute.

The results are presented in Table I below and show that N-(2,2,6,6-tetramethyl-4-piperidinyl)-N'-aminooxamide, a HALS hydrazide having the dicarbonyl moiety (a compound of the present invention), provides for better retention of elongation than the HALS hydrazide of the prior art, 3-(2,2,6,6-tetramethyl-4-piperidinyl)-propionic hydrazide.

TABLE 1

| HALS Hydrazide | Percent Retained Elongation after Hours in QUV * | | | |
|---|---|---|---|---|
| | 168 | 336 | 504 | 672 |
| N-(2,2,6,6,-tetra-methyl-4-piperidinyl)-N'-aminooxamide | 79.8 | 68.1 | 54.1 | 53.6 |
| 3-(2,2,6,6-tetramethyl-4-piperidinylamino)-propionic hydrazide | 68.1 | 48.6 | 40.2 | 36.0 |

The present invention may be embodied in other specific forms without departing from the spirit or essential attributes thereof and, accordingly, reference should be made to the appended claims, rather than to the foregoing specification as indicating the scope of the invention.

We claim:

1. A light stabilized polyurethane, polyurea or polyurethane-polyurea polymer comprising the polymer and a polymer bound additive attached to the polymer, the polymer bound additive having a Formula I or Formula II:

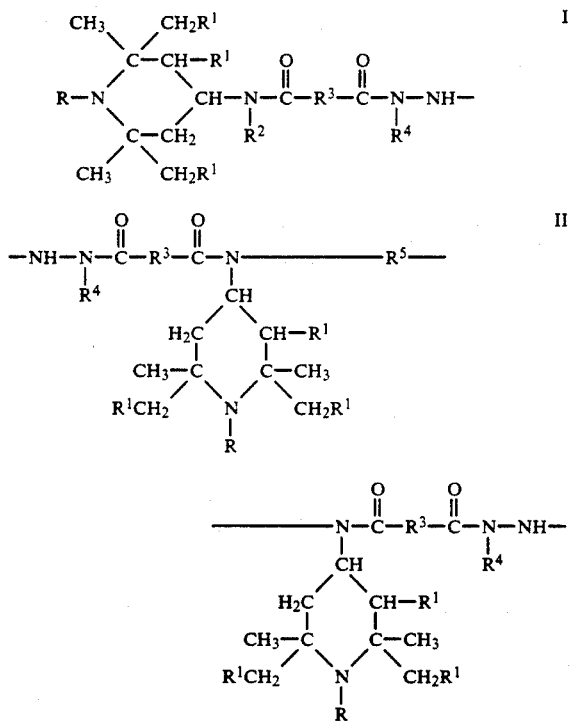

wherein
R is hydrogen, oxyl, hydroxy, substituted or unsubstituted aliphatic of 1-20 carbons, substituted or unsubstituted alicyclic of 5-12 carbons, substituted or unsubstituted araliphatic of 7-22 carbons, substituted or unsubstituted aliphatic acyl of 2-20 carbons, substituted or unsubstituted alicyclic acyl of 7-16 carbons, substituted or unsubstituted aromatic acyl of 7-11 carbons, substituted or unsubstituted araliphatic acyl of 7-22 carbons, —(C(=O))$_a$—N(R$^6$) (R$^7$), —(C(=O))$_a$—O—R$^8$, —(CH$_2$)$_a$—C(=O)—O—R$^9$ or —(CH$_2$—CH(R$^{10}$)—O)$_b$—R$^{11}$;

R$^1$ is hydrogen or aliphatic of 1-4 carbons;

R$^2$ is hydrogen, substituted or unsubstituted aliphatic of 1-20 carbons, a substituted or unsubstituted alicyclic group of 5-12 carbons which may contain an —N(R$^{12}$)— heteroatom as a group member, with the proviso that there are at least two carbon atoms between the —N(R$^{12}$)— heteroatom and the point of attachment of the alicyclic group, substituted or unsubstituted aryl of 6-14 carbons, substituted or unsubstituted araliphatic of 7-22 carbons or 2-cyanoethyl;

R$^3$ is a direct bond, a substituted or unsubstituted aliphatic diradical of 1-20 carbons, a substituted or unsubstituted aryl diradical of 6-12 carbons, a substituted or unsubstituted alicyclic diradical of 5-12 carbons or a substituted or unsubstituted araliphatic diradical of 7-22 carbons, where the diradical may contain —O—, —S— or —NH— oms, with the proviso that multiple heteroatoms must be separated from each other and the diradical ends by at least one carbon atom;

R$^2$ and R$^3$ may be linked together to form a 5-membered lactam ring;

R$^4$ is hydrogen, substituted or unsubstituted aliphatic of 1-20 carbons, substituted or unsubstituted araliphatic of 7-22 carbons or substituted or unsubstituted alicyclic of 5-12 carbons;

R$^5$ is a substituted or unsubstituted aliphatic diradical of 2-18 carbons, a substituted or unsubstituted alicyclic diradical of 5-18 carbons or a substituted or unsubstituted araliphatic diradical of 7-18 carbons, the aliphatic chains of which may contain —O—, —S— or —N(R$^{12}$)— heteroatoms, with the proviso that multiple heteroatoms must be separated from each other and the diradical ends by at least two carbon atoms;

R$^6$ and R$^7$ are independently hydrogen, substituted or unsubstituted aliphatic of 1-20 carbons, substituted or unsubstituted aryl of 6-14 carbons, substituted or unsubstituted araliphatic of 7-22 carbons or a substituted or unsubstituted alicyclic group of 5-12 carbons which may contain an —N(R$^{12}$)— heteroatom as a group member, with the proviso that there are at least two carbon atoms between the —N(R$^{12}$)— heteroatom and the point of attachment of the alicyclic group;

R$^6$ and R$^7$ may be linked together by a direct bond or may be linked together through an —O— or —N(R$^{12}$)— heteroatom to form a heterocyclic ring of 5-7 atoms, with the proviso that there are at least two carbon atoms between the —O— or —N(R$^{12}$)— heteroatom and the nitrogen atom to which R$^6$ and R$^7$ are attached;

R$^8$ is substituted or unsubstituted aliphatic of 1-20 carbons, substituted or unsubstituted alicyclic of 5-12 carbons, substituted or unsubstituted aryl of 6-14 carbons or substituted or unsubstituted araliphatic of 7-22 carbons;

R$^9$, R$^{10}$ and R$^{11}$ are independently hydrogen, substituted or unsubstituted aliphatic of 1-20 carbons, substituted or unsubstituted alicyclic of 5-12 carbons, substituted or unsubstituted aryl of 6-14 carbons or substituted or unsubstituted araliphatic of 7-22 carbons;

R$^{12}$ is hydrogen, substituted or unsubstituted aliphatic of 1-20 carbons, substituted or unsubstituted alicyclic of 5-12 carbons, substituted or unsubstituted araliphatic of 7-22 carbons, substituted or unsubstituted aliphatic acyl of 2-20 carbons, substituted or unsubstituted alicyclic acyl of 7-16 carbons, substituted or unsubstituted aromatic acyl of 7-11 carbons, substituted or unsubstituted araliphatic acyl of 7-22 carbons, $-(C(=O))_a-N(R^{13})(R^{14})$, $-(C(=O))_a-O-R^8$, $-(CH_2)_a-C(=O)-O-R^9$ or $-CH_2-CH(R^{10})-O)_b-R^{11}$ $R^{13}$ and $R^{14}$ and are independently hydrogen, substituted or unsubstituted aliphatic of 1-20 carbons, substituted or unsubstituted aryl of 6-14 carbons, substituted or unsubstituted araliphatic of 7-22 carbons or a substituted or unsubstituted alicyclic group of 5-12 carbons which may contain an —NH— heteroatom as a group member, with the proviso that there are at least two carbon atoms between the —NH— heteroatom and the point of attachment of the alicyclic group;

$R^{13}$ and may be linked together by a direct bond or may be linked together through an —O— or —NH— heteroatom to form a heterocyclic ring of 5-7 atoms, with the proviso that there are at least two carbon atoms between the —O— or —NH— heteroatom and the nitrogen atom to which $R^{13}$ and $R^{14}$ are attached:

a is 1 or 2;
b is an integer from 2-50; and
substituents for any of R, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ are one or more of chloro, bromo, alkyl of 1-8 carbons, alkoxy of 1-12 carbons, phenoxy, cyano, hydroxy, epoxy, carboxy, benzoyl, benzoyloxy, dialkylamino of 2-8 carbons, alkoxycarbonyl of 2-6 carbons, acyloxy of 1-4 carbons, acryloyl, acryloyloxy, methacryloyl, methacryloyloxy, hydroxymethyl, hydroxyethyl, alkylthio of 1-4 carbons or trialkoxysilyl of 3-12 carbons.

2. The polymer according to claim 1 wherein
R is hydrogen, substituted or unsubstituted aliphatic of 1-4 carbons, substituted or unsubstituted araliphatic of 7-10 carbons, substituted or unsubstituted aliphatic acyl of 2-6 carbons or substituted or unsubstituted benzoyl;
$R^1$ is hydrogen or methyl;
$R^2$ is hydrogen, alkyl of 1-4 carbons or 2,2,6,6-tetramethyl-4-piperidinyl;
$R^3$ is a direct bond, a substituted or unsubstituted alkylene diradical of 1-8 carbons or a substituted or unsubstituted o-, m- or p-phenylene diradical;
$R^4$ is hydrogen;
$R^5$ is an alkylene diradical of 2 to 12 carbons, an alkylene diradical of 4 to 12 carbons which contains 1 to 2 —O— or —NH— heteroatoms, with the proviso that multiple heteroatoms must be separated from each other and the diradical ends by at least one carbon atom, a cycloalkylene diradical of 5 to 12 carbons, an arylene diradical of 6 to 12 carbons or an aralkylene diradical of 8 to 12 carbons;
$R^6$, $R^7$, $R^{13}$ and $R^{14}$ and are independently hydrogen, substituted or unsubstituted aliphatic of 1-8 carbons, substituted or unsubstituted phenyl or substituted or unsubstituted benzyl;
$R^8$ is substituted or unsubstituted aliphatic of 1-8 carbons, substituted or unsubstituted phenyl or substituted or unsubstituted benzyl;
$R^9$, $R^{10}$ and $R^{11}$ and are independently hydrogen, substituted or unsubstituted aliphatic of 1-8 carbons, substituted or unsubstituted phenyl or substituted or unsubstituted benzyl; and
$R^{12}$ is hydrogen, substituted or unsubstituted aliphatic of 1-4 carbons, substituted or unsubstituted araliphatic of 7-10 carbons, substituted or unsubstituted aliphatic acyl of 2-6 carbons or substituted or unsubstituted benzoyl.

3. The polymer according to claim 2 wherein
R is hydrogen, methyl, acetyl or benzoyl;
$R^1$ and $R^2$ are independently hydrogen;
$R^3$ is a direct bond or a substituted or unsubstituted alkylene diradical of 1-7 carbons;
$R^5$ is an alkylene diradical of 2 to 6 carbons or an oxydialkylene diradical of 4 to 8 carbons;
$R^6$ $R^{13}$ and are independently hydrogen, methyl or ethyl;
$R^7$ and $R^{14}$ are independently substituted or unsubstituted aliphatic of 1-8 carbons or substituted or unsubstituted phenyl; and
$R^{12}$ is hydrogen, methyl, acetyl or benzoyl.

4. A process for preparing a light stabilized polyurethane, polyurea or polyurethanepolyurea polymer comprising polymerizing a monomer blend having about 0.01% by weight to about 5% by weight, based upon the weight of the monomer, of a hindered amine light stabilizer having the following Formula III or Formula IV:

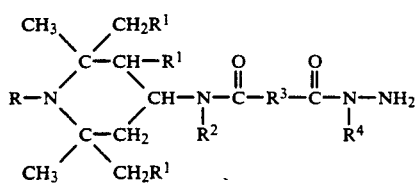

III

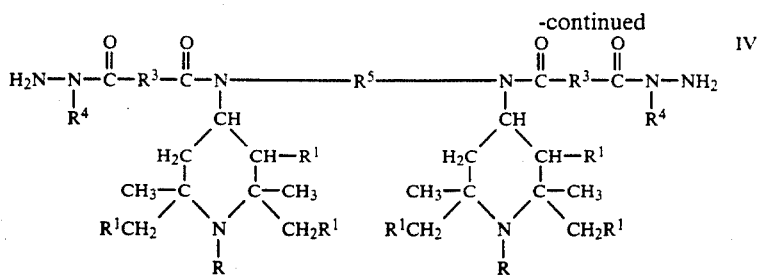

wherein

R is hydrogen, oxyl, hydroxy, substituted or unsubstituted aliphatic of 1-20 carbons, substituted or unsubstituted alicyclic of 5-12 carbons, substituted or unsubstituted araliphatic of 7-22 carbons, substituted or unsubstituted aliphatic acyl of 2-20 carbons, substituted or unsubstituted alicyclic acyl of 7-16 carbons, substituted or unsubstituted aromatic acyl of 7-11 carbons, substituted or unsubstituted araliphatic acyl of 7-22 carbons, —(C(=O)-)$_a$—N(R$^6$)(R$^7$), —(C(=O))$_a$—O—R$^8$, —(CH$_2$)$_a$—C(=O)—O—R$^9$ or —(CH$_2$—CH(R$^{10}$)—O)$_b$—R$^{11}$;

R$^1$ is hydrogen or aliphatic of 1-4 carbons;

R$^2$ is hydrogen, substituted or unsubstituted aliphatic of 1-20 carbons, a substituted or unsubstituted alicyclic group of 5-12 carbons which may contain an —N(R$^{12}$)— heteroatom as a group member, with the proviso that there are at least two carbon atoms between the —N(R$^{12}$)— heteroatom and the point of attachment of the alicyclic group, substituted or unsubstituted aryl of 6-14 carbons, substituted or unsubstituted araliphatic of 7-22 carbons or 2-cyanoethyl;

R$^3$ is a direct bond, a substituted or unsubstituted aliphatic diradical of 1-20 carbons, a substituted or unsubstituted aryl diradical of 6-12 carbons, a substituted or unsubstituted alicyclic diradical of 5-12 carbons or a substituted or unsubstituted araliphatic diradical of 7-22 carbons, where the diradical may contain —O—, —S— or —NH— heteroatoms, with the proviso that multiple heteroatoms must be separated from each other and the diradical ends by at least one carbon atom;

R$^2$ and R$^3$ may be linked together to form a 5-membered lactam ring;

R$^4$ is hydrogen, substituted or unsubstituted aliphatic of 1-20 carbons, substituted or unsubstituted araliphatic of 7-22 carbons or substituted or unsubstituted alicyclic of 5-12 carbons;

R$^5$ is a substituted or unsubstituted aliphatic diradical of 2-18 carbons, a substituted or unsubstituted alicyclic diradical of 5-18 carbons or a substituted or unsubstituted araliphatic diradical of 7-18 carbons, the aliphatic chains of which may contain —O—, —S— or —N(R$^{12}$)— teroatoms, with the proviso that multiple heteroatoms must be separated from each other and the diradical ends by at least two carbon atoms;

R$^6$ and R$^7$ are independently hydrogen, substituted or unsubstituted aliphatic of 1-20 carbons, substituted or unsubstituted aryl of 6-14 carbons, substituted or unsubstituted araliphatic of 7-22 carbons or a substituted or unsubstituted alicyclic group of 5-12 carbons which may contain an —N(R$^{12}$)— heteroatom as a group member, with the proviso that there are at least two carbon atoms between the —N(R$^{12}$)— heteroatom and the point of attachment of the alicyclic group;

R$^6$ and R$^7$ may be linked together by a direct bond or may be linked together through an —O— or —N(R$^{12}$)— heteroatom to form a heterocyclic ring of 5-7 atoms, with the proviso that there are at least two carbon atoms between the —O— or —N(R$^{12}$)— heteroatom and the nitrogen atom to which R$^6$ and R$^7$ are attached;

R$^8$ is substituted or unsubstituted aliphatic of 1-20 carbons, substituted or unsubstituted alicyclic of 5-12 carbons, substituted or unsubstituted aryl of 6-14 carbons or substituted or unsubstituted araliphatic of 7-22 carbons;

R$^9$, R$^{10}$ and R$^{11}$ are independently hydrogen, substituted or unsubstituted aliphatic of 1-20 carbons, substituted or unsubstituted alicyclic of 5-12 carbons, substituted or unsubstituted aryl of 6-14 carbons or substituted or unsubstituted araliphatic of 7-22 carbons;

R$^{12}$ is hydrogen, substituted or unsubstituted aliphatic of 1-20 carbons, substituted or unsubstituted alicyclic of 5-12 carbons, substituted or unsubstituted araliphatic of 7-22 carbons, substituted or unsubstituted aliphatic acyl of 2-20 carbons, substituted or unsubstituted alicyclic acyl of 7-16 carbons, substituted or unsubstituted aromatic acyl of 7-11 carbons, substituted or unsubstituted araliphatic acyl of 7-22 carbons, —(C(=O))$_a$—N(R$^{13}$)(R$^{14}$), —(C(=O))$_a$—O—R$^8$, —(CH$_2$)$_a$—C(=O)—O—R$^9$ or —(CH$_2$—CH(R$^{10}$)—O)$_b$—R$^{11}$;

R$^{13}$ and R$^{14}$ are independently hydrogen, substituted or unsubstituted aliphatic of 1-20 carbons, substituted or unsubstituted aryl of 6-14 carbons, substituted or unsubstituted araliphatic of 7-22 carbons or a substituted or unsubstituted alicyclic group of 5-12 carbons which may contain an —NH— heteroatom as a group member, with the proviso that there are at least two carbon atoms between the —NH— heteroatom and the point of attachment of the alicyclic group;

R$^{13}$ and R$^{14}$ may be linked together by a direct bond or may be linked together through an —O— or —NH— heteroatom to form a heterocyclic ring of 5-7 atoms, with the proviso that there are at least two carbon atoms between the —O— or —NH— heteroatom and the nitrogen atom to which R$^{13}$ and R$^{14}$ are attached;

a is 1 or 2;

b is an integer from 2-50; and substituents for any of R, R$^2$, R$^3$, R$^4$, R$^5$, R$^6$, R$^7$, R$^8$, R$^9$, R$^{10}$, R$^{11}$, R$^{12}$, R$^{13}$, and R$^{14}$ are one or more of chloro, bromo, alkyl of 1-8 carbons, alkoxy of 1-12 carbons, phenoxy, cyano, hydroxy, epoxy, carboxy, benzoyl, benzoyloxy, dialkylamino of 2-8 carbons, alkoxycarbonyl of 2-6 carbons, acyloxy of 1-4 carbons, acryloyl, acryloyloxy, methacryloyl, methacryloyloxy, hydroxymethyl, hydroxyethyl, alkylthio of 1-4 carbons or trialkoxysilyl of 3-12 carbons.

5. The polymer according to claim 4 wherein
R is hydrogen, substituted or unsubstituted aliphatic of 1-4 carbons, substituted or unsubstituted araliphatic of 7-10 carbons, substituted or unsubstituted aliphatic acyl of 2-6 carbons or substituted or unsubstituted benzoyl;
$R^1$ is hydrogen or methyl;
$R^2$ is hydrogen, alkyl of 1-4 carbons or 2,2,6,6-tetramethyl-4-piperidinyl;
$R^3$ is a direct bond, a substituted or unsubstituted alkylene diradical of 1-8 carbons or a substituted or unsubstituted o-, m- or p-phenylene diradical;
$R^4$ is hydrogen;
$R^5$ is an alkylene diradical of 2 to 12 carbons, an alkylene diradical of 4 to 12 carbons which contains 1 to 2 —O— or —NH— heteroatoms, with the proviso that multiple heteroatoms must be separated from each other and the diradical ends by at least one carbon atom, a cycloalkylene diradical of 5 to 12 carbons, an arylene diradical of 6 to 12 carbons or an aralkylene diradical of 8 to 12 carbons;
$R^6$, $R^7$, $R^{13}$ and $R^{14}$ are independently hydrogen, substituted or unsubstituted aliphatic of 1-8 carbons, substituted or unsubstituted phenyl or substituted or unsubstituted benzyl;
$R^8$ is substituted or unsubstituted aliphatic of 1-8 carbons, substituted or unsubstituted phenyl or substituted or unsubstituted benzyl;
$R^9$, $R^{10}$ and $R^{11}$ are independently hydrogen, substituted or unsubstituted aliphatic of 1-8 carbons, substituted or unsubstituted phenyl or substituted or unsubstituted benzyl; and
$R^{12}$ is hydrogen, substituted or unsubstituted aliphatic of 1-4 carbons, substituted or unsubstituted araliphatic of 7-10 carbons, substituted or unsubstituted aliphatic acyl of 2-6 carbons or substituted or unsubstituted benzoyl.

6. The polymer according to claim 5 wherein
R is hydrogen, methyl, acetyl or benzoyl;
$R^1$ and $R^2$ are independently hydrogen;
$R^3$ is a direct bond or a substituted or unsubstituted alkylene diradical of 1-7 carbons;
$R^5$ is an alkylene diradical of 2 to 6 carbons or an oxydialkylene diradical of 4 to 8 carbons;
$R^6$ and $R^{13}$ are independently hydrogen, methyl or ethyl;
$R^7$ and $R^{14}$ are independently substituted or unsubstituted aliphatic of 1-8 carbons or substituted or unsubstituted phenyl; and
$R^{12}$ is hydrogen, methyl, acetyl or benzoyl.

* * * * *